Feb. 6, 1934.　　　　H. W. BROWN　　　　1,946,303
DYNAMO ELECTRIC MACHINE CONTROL
Filed June 22, 1932
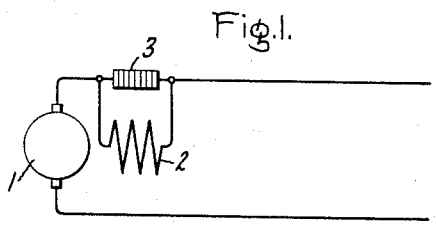
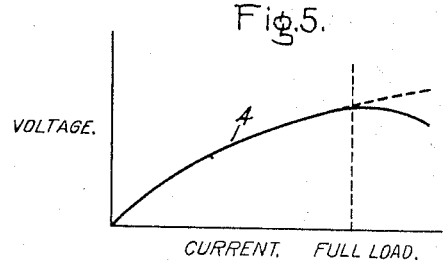
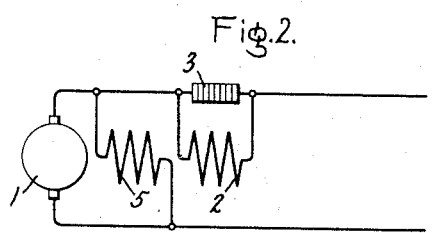
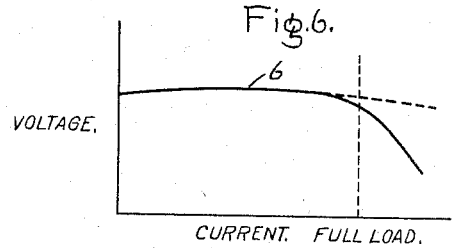
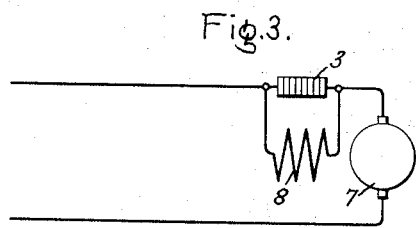
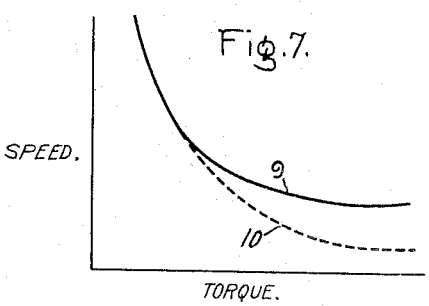
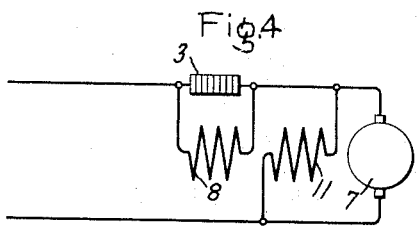
Inventor:
Harold W. Brown,
by Charles Mullen
His Attorney.

Patented Feb. 6, 1934

1,946,303

UNITED STATES PATENT OFFICE 1,946,303

DYNAMO-ELECTRIC MACHINE CONTROL

Harold W. Brown, Schenectady, N. Y., assignor to General Electric Company, a corporation of New York Application June 22, 1932. Serial No. 618,738

9 Claims. (Cl. 171—229)

My invention relates broadly to dynamo-electric machine control and more particularly to an arrangement for modifying the operating characteristics of dynamo-electric machines, having series field windings, by automatically causing the current through such machines to increase at a greater rate than the current increases through their series field windings.

It is often desirable to limit prematurely the voltage rise of series generators, whether they are direct current generators or alternating current generators, as the load increases, and thereby to give such machines an accelerated drooping voltage characteristic with increases in load. It is also often desirable to cause series motors, whether direct current machines or alternating current machines, to have a higher than normal speed at the higher load values at which they are operated. In accordance with my invention, I secure these results by providing means for causing the load current through series machines to increase at a greater rate than the current through their series field windings.

In accordance with preferred embodiments of my invention, I employ a negative impedance-current characteristic impedance connected in parallel with the series winding of the controlled dynamo-electric machine. By negative impedance-current characteristics impedance I mean an impedance whose ohmic value decreases with increases in current therethrough, or voltage thereacross. Many such impedance devices are known in the art. For example, there are impedance devices of this character which operate through temperature changes. Thus certain forms of carbon and boron have negative temperature coefficients of resistance and increases in current through these elements raise their temperature and thus cause a reduction in their electrical resistance. Another negative impedance-current characteristic device is a self-saturating reactor. Such reactors are well known in the art and they are often combined with capacitors to produce non-linear circuit arrangements having an overall negative impedance current characteristic. While my invention is not limited to any particular type of negative impedance-current characteristic impedance device, I at present prefer to use the special ceramic resistance material which is disclosed and claimed in Patent No. 1,822,742 granted September 8, 1931, on an application of K. B. McEachron and assigned to the assignee of the present application. This material has the property of substantially instantaneously reducing its electrical resistance with increases in current through it or voltage across it and its resistance is substantially independent of its temperature.

The object of my invention is to provide a novel and simple control arrangement for dynamo-electric machines having series windings.

Another object of my invention is to provide novel and simple automatic means for producing a drooping voltage characteristic with increases in load on series generators.

A further object of my invention is to provide novel and simple means for automatically increasing the normal speed at the higher loads applied to series electric motors.

My invention will be better understood from the following description taken in connection with the accompanying drawing, and its scope will be pointed out in the appended claims.

In the drawing, Figs. 1, 2, 3 and 4 illustrate applications of my invention to a direct current series generator, a compound wound series generator, a direct current series motor and a compound series motor, respectively, while Figs. 5, 6 and 7 illustrate how my invention modifies the operating characteristics of the machines illustrated in Figs. 1, 2 and 3, respectively.

Referring now to Fig. 1, I have shown a series generator 1, which it will be assumed is a direct current generator, although it may also be an alternating current series generator, having a series field winding 2, connected in parallel with which is a negative resistance-current characteristic resistance device 3. Device 3 may be any type of negative resistance-current characteristic element and it is preferably a resistance element composed of the material which is described and claimed in the above mentioned McEachron patent.

The operation of the arrangement illustrated in Fig. 1 will be made clear by reference to Fig. 5. In this figure curve 4 is the voltage characteristic of machine 1 with increases in current therethrough. As shown, this curve has a decided voltage droop at the higher current values corresponding to full load, or above. The dotted portion of the curve illustrates the ordinary voltage-current characteristic of a series generator. The drooping characteristic of curve 4 is produced by the action of resistance 3 whose resistance value decreases with increases in load on generator 1 thereby causing the field current through series field winding 2 to increase at a lower rate than the current through the machine.

The embodiment of my invention illustrated in Fig. 2 differs from the embodiment illustrated in Fig. 1 in that machine 1 is provided with a shunt field winding 5. Curve 6 of Fig. 6 illustrates how the negative resistance current characteristic resistance 3 causes a droop in the voltage characteristic of the machine 1. The dotted portion of curve 6 shows the ordinary substantially flat voltage characteristic of a compound wound direct current generator.

In Fig. 3, I have shown a series motor 7, which may be either a direct current or an alternating current series motor but which will be assumed to be a direct current series motor. This motor is provided with a series field winding 8 connected in parallel with which is a negative resistance-current characteristic resistance device 3.

Fig. 7 illustrates the effect of resistance device 3 on the speed torque curve of the motor 7. In this figure the solid curve 9 is the curve of machine 7 when it is provided with the negative resistance-current characteristic device 3, while the dotted curve 10 illustrates the speed torque curve of motor 7 when the device 3 is omitted. The operation of device 3 in producing the modified characteristic 9 may be explained as follows. As the load and torque of motor 7 increases, the current through it also increases and this tends to increase the current through device 3 thereby reducing its resistance whereby a greater than normal proportion of the total current tends to pass through resistance 3 and a less than normal proportion of the total current tends to pass through the series winding 8. The excitation of motor 7 therefore does not increase as fast as it ordinarily does in a series motor and consequently the speed must increase in order to produce the requisite counter-electromotive force.

In Fig. 4, I have shown the series motor 7 modified to provide a compound motor by the addition of a shunt winding 11. In general the speed torque curve of the motor of Fig. 4 will be modified in a similar manner to the modification of the same curve for the machine of Fig. 3.

While I have shown and described particular embodiments of my invention it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a dynamo-electric machine having a series field winding, and a negative impedance-current characteristic impedance material connected in parallel with said series field winding so that increases in current through said field winding cause decreases in the value of said impedance.

2. In combination, a direct current dynamo-electric machine having a series field winding, and a substantially instantaneously acting negative resistance-current characteristic resistance material whose resistance value is substantially independent of its temperature connected in parallel with said series field winding.

3. In combination, a direct current dynamo-electric machine having a series field winding and a shunt field winding, and a negative resistance-current characteristic resistance connected in parallel with said series field winding so that increases in current through said series field winding cause decreases in the value of said resistance.

4. In combination, a series generator, and means for giving said generator an accelerated drooping voltage characteristic with increasing load comprising a negative impedance-current characteristic impedance material connected in parallel with the series field winding of said generator.

5. In combination, a direct current series generator, and means for giving said generator an accelerated drooping voltage characteristic with increasing load comprising a substantially instantaneously acting negative resistance-current characteristic resistance material connected in parallel with the series field winding of said generator.

6. In combination, a direct current compound wound generator, and means for giving said generator a drooping voltage characteristic with increasing load, comprising a negative resistance-current characteristic resistance material connected in parallel with the series winding of said generator.

7. In combination, a direct current electric motor having a series field winding, and a negative resistance-current characteristic resistance material connected in parallel with said series field winding so that increases in current through said field winding cause decreases in the value of said resistance.

8. In combination, a series motor, and means for increasing the full load speed of said motor comprising a negative impedance-current characteristic impedance material connected in parallel with the series field winding of said motor.

9. In combination, a direct current series motor, and means for increasing the full load speed of said motor comprising a substantially instantaneously acting negative resistance-current characteristic resistance material connected in parallel with the series field winding of said motor.

HAROLD W. BROWN.